US010594952B2

(12) United States Patent
Zivkovic

(10) Patent No.: US 10,594,952 B2
(45) Date of Patent: Mar. 17, 2020

(54) KEY FRAME SELECTION IN BURST IMAGING FOR OPTIMIZED USER EXPERIENCE

(71) Applicant: Intel Corporation, Santa Clara, CA (US)

(72) Inventor: Zoran Zivkovic, Hertogenbosch (NL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/927,503

(22) Filed: Mar. 21, 2018

(65) Prior Publication Data

US 2019/0045142 A1    Feb. 7, 2019

(51) Int. Cl.
*H04N 5/262*  (2006.01)
*H04N 5/232*  (2006.01)
*H04N 5/235*  (2006.01)

(52) U.S. Cl.
CPC ......... *H04N 5/2625* (2013.01); *H04N 5/2355* (2013.01); *H04N 5/2356* (2013.01); *H04N 5/23229* (2013.01); *H04N 5/232123* (2018.08); *H04N 5/23245* (2013.01)

(58) Field of Classification Search
CPC ............ H04N 5/2625; H04N 5/23245; H04N 5/23229
USPC ................ 348/335, 340, 345, 348, 350, 352
See application file for complete search history.

(56) References Cited

U.S. PATENT DOCUMENTS

| 9,538,081 | B1 * | 1/2017 | Zhou | H04N 5/23248 |
| 2009/0007202 | A1 * | 1/2009 | Williams | H04N 7/17309 725/105 |
| 2009/0262198 | A1 * | 10/2009 | Yamagishi | H04N 17/004 348/180 |
| 2015/0138406 | A1 * | 5/2015 | Sokeila | H04N 5/23245 348/262 |
| 2017/0134639 | A1 * | 5/2017 | Pitts | H04N 5/23212 |

OTHER PUBLICATIONS

Adams, A., et al. "The Frankencamera: An Experimental Platform for Computational Photography", Communications of the ACM, vol. 55 No. 11, pp. 90-98. (Nov. 2012).
Hasinoff, et al. "Burst photography for high dynamic range and low-light imaging on mobile cameras", ACM Transactions on Graphics (Proc. SIGGRAPH Asia 2016), 35(6), 12 pp.

* cited by examiner

*Primary Examiner* — Yogesh K Aggarwal
(74) *Attorney, Agent, or Firm* — Green, Howard & Mughal LLP.

(57) ABSTRACT

Systems, devices, and techniques related to selecting a key frame for burst image processing are discussed. Such techniques may include generating key frame scores for at least some frames of a multi-frame burst image capture such that the key frame scores include a combination of an image quality component, a shutter lag component, and a burst image processing latency component and selecting a frame having a maximum key frame score as the key frame.

25 Claims, 9 Drawing Sheets

KEY FRAME SELECTION IN BURST IMAGING FOR OPTIMIZED USER EXPERIENCE

BACKGROUND

In image capture contexts, burst imaging may be used to improve image quality and dynamic range. In burst imaging, a burst of image frames are captured (i.e., a number of frames are captured in rapid succession) and the captured frames are combined into a single high quality image or frame. A typical starting point for combining the frames is to select a so called key frame from the burst of frames. The selected key frame is used as the base for combining the other frames and selection of the key frame is an important factor in the quality of the resultant combined frame. Along with resultant image quality, other factors that impact user experience include timing aspects such as perceived lag in presentment of the resultant image.

It is with respect to these and other considerations that the present improvements have been needed. Such improvements may become critical as the desire to utilize burst imaging in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
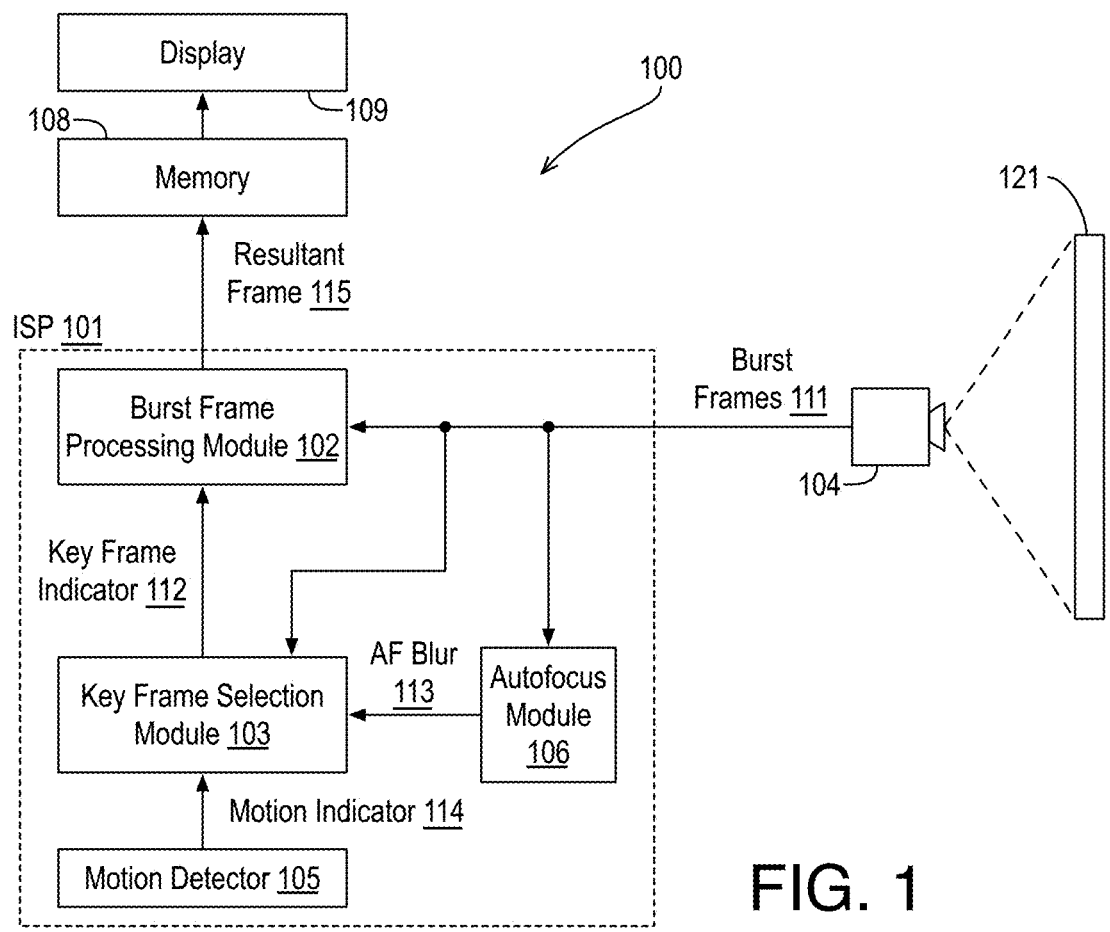
FIG. 1 illustrates components of an example system for performing burst imaging.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or such embodiments, or examples, etc., indicate that the implementation, embodiment, or example described may include a particular feature, structure, or characteristic, but every implementation, embodiment, or example may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to affect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to burst image processing and, in particular, to key frame selection for burst image processing.

As described above, in some contexts, burst imaging may be used to improve image quality and dynamic range. Selection of a key frame for burst image processing may be an important factor in image quality and device performance. As used herein, a key frame or key image for burst image processing is a frame selected from among the multiple frames captured in the burst image capture that is used as a base for the burst image processing. In particular, in burst image processing, the key frame is not shifted while the other frames are at least partially shifted, modified, or registered (e.g., using motion vector fields) to the key frame in an attempt to match to the key frame temporally and spatially. The burst image processing may then include, after registration of the frames to the key frame, averaging the frames in the burst (e.g., on a pixel wise basis), averaging portions of the frames, taking median pixel values of the frames, and/or other processing to generate a resultant frame. Such techniques provide for output images of a scene that have improved image quality and/or dynamic range.

FIG. 1 illustrates components of an example system 100 for performing burst imaging, arranged in accordance with at least some implementations of the present disclosure. As shown in FIG. 1, system 100 may include an image signal processor (ISP) 101 to implement a burst frame processing module 102, a key frame selection module 103, an autofocus module 104, and a motion detector 105, a memory 108, a display 109, and a camera 104. In some embodiments, autofocus module 106 is implemented as a separate processor from ISP 101. Also as shown, camera 104 captures multiple burst images or burst frames 111 based on scene 121. For example, any number of burst frames 111 may be captured in response to a command from a user such that burst frames 111 include frames taken in rapid succession such as at a maximum frame rate achievable by system 100. For example, burst frames 111 may be taken at 10 frames per second (fps), 30 fps, 60 fps, or faster. After processing by ISP 101, a resultant frame 115 is generated based on burst frames 111 such that resultant frame 115 is a single frame having improved image quality and/or dynamic range over that attainable by capture of a single frame or image by camera 104. Thereby, in burst mode, system may output a single resultant frame 115.

Camera 104 may include any suitable camera such as a color camera including, for example, an image sensor and an optional pre-processor that may provide demosaicing for example. In other embodiments, ISP 101 receives raw image data and generates burst frames 111. As shown, resultant frame 115 may be stored to memory 108 for eventual display to a user via display 109, for use in other applications, etc. In addition, burst frames 111 may be stored in memory 108 or another memory accessible to ISP 101. System 100 may be implemented in any other suitable imaging device such as a personal computer, a laptop computer, a tablet, a phablet, a smart phone, a digital camera, a gaming console, a wearable device, a set top device, or the like.

Burst frames 111 may include image data in any suitable color space. For example, burst frames 111 may include red-green-blue (RGB) image data YUV image data, YCbCR image data, or the like such that each pixel location of each of burst frames 111 includes a pixel value for the pertinent luma and/or color channels. Although characterized herein as frames, burst frames 111, resultant frame 115, and any other frames discussed herein may be characterized as images, image frames, or the like. For example, the terms frame and image are used interchangeably herein and each is meant to indicate a data structure including pixel values for color channels as described above in a compressed or uncompressed format such that the data structure may be rendered for display via, for example, display 109.

Burst frames 111 are received by burst frame processing module 102, key frame selection module 103, and autofocus module 104. Burst frames 111 and/or other data associated with burst frames 111 (not shown) may include metadata corresponding to burst frames 111 such time stamps for each of burst frames 111, a frame count number (i.e., index) for each of burst frames 111, or other information or data indicative of the order of burst frames 111 and/or the timing of burst frames 111 relative to one another. Furthermore, autofocus module 104 may generate, for each of burst frames 111, a measure of blur (e.g., autofocus, AF, blur) 113 or similar measurement for use in autofocusing camera 104. AF blur 113 may be used as indicator of image quality of burst frames 111 as is discussed further herein. In addition or in the alternative, key frame selection module 103 or another module of ISP 101 may generate an image quality measure or value for each of burst frames 111. The image quality values may be any suitable values indicative of image quality or image sharpness such as one or a combination of a measure of the high frequency component(s) of the frame, a number or strength of edges in the frame, an inverse of system motion or shake (as detected by a gyroscope, not shown), a measure of image contrast, a measure of a vertical and/or horizontal gradients, or any other indicator of image quality. Such an image quality value or measure may be normalized to a range of zero to one, for example.

As discussed further herein, using the image quality value for a frame of burst frames 111, key frame selection module 103 generates an image quality component of a key frame score for the frame. In addition, based on a shutter lag value for the frame, key frame selection module 103 generates an image quality component of the key frame score and, based on a burst image processing latency value for the frame, key frame selection module 103 generates a burst image processing latency component of the key frame score for the frame. In some embodiments, the key frame score also includes a motion moving object component. As used herein, the term component indicates a value or measure that is to be combined with other components to generate a key frame score for a frame. For example, the component may be a measure or value corresponding to user experience for the particular component such that a larger measure or value indicates greater user experience for the component. The components may be combined using any suitable technique or techniques such as summation, multiplication, weighted summation, or the like to generate the key frame score. Each of the components may be used as a factor in generating the key frame score.

Based on the key frame scores of burst frames 111, a key frame is selected from among burst frames 111. The selected key frame is indicated by key frame indicator 112 using any suitable data structure such as an indicator of the key frame count of the selected key frame. For example, if nine burst frames 111 are captured, they may be labeled or indexed 0 to 8 in temporal capture order and key frame indicator 112 may indicate the selected key frame using the pertinent frame label from the capture order labels. Burst frame processing module 102 receives burst frames 111 and key frame indicator 112 and burst frame processing module 102 generates resultant frame 115 using the selected key frame as a base for the burst frame processing. Burst frame processing module 102 may generate resultant frame 115 using any suitable technique or techniques such that the selected key frame is not shifted during processing. For example, burst frame processing module 102 may shift or register other frames of burst frames 111 to the selected key frame (which is not shifted) using motion vector fields or the like to match the other frames of burst frames 111 to the selected key frame. Burst frame processing module 102 may then, after registration of frames to the key frame, average the frames (all frames including the key frame), weighted average the frames (by weighting the key frame and adjacent frames more heavily) average or weighted average portions of the frames, average or weighted average all or portions of some of the frames (e.g., discarding any outlier frames or frame portions), take median pixel values of the frames, portions of frames, or subset of frames, or a combination thereof. As shown, resultant frame 115 is provided to memory 108 for storage and/or presentation to a user via display 109.

The techniques discussed herein provide for selection of a key frame taking into account factors such as image quality impact of selecting one of burst frames 111, capture lag impact of selecting one of burst frames 111, expected shot or processing latency of selecting one of burst frames 111, and moving object impact of selecting one of burst frames 111 (if motion is detected). For example, selecting a key frame having high image quality may improve the image quality of resultant frame 115. Furthermore, timing aspects influence the final user experience. For example, selecting the last frame of burst frames 111 as the key frame may be less desirable as it will extend user perceived shutter lag (i.e., the delta between the image captured and the image expected by the user based on the moment they actuated image capture) and latency of the processing (i.e., the delta between the moment the image capture was actuated and the presentment of resultant frame 115). Such factors and others, are used for key frame selection as discussed further herein.

Figure 2:
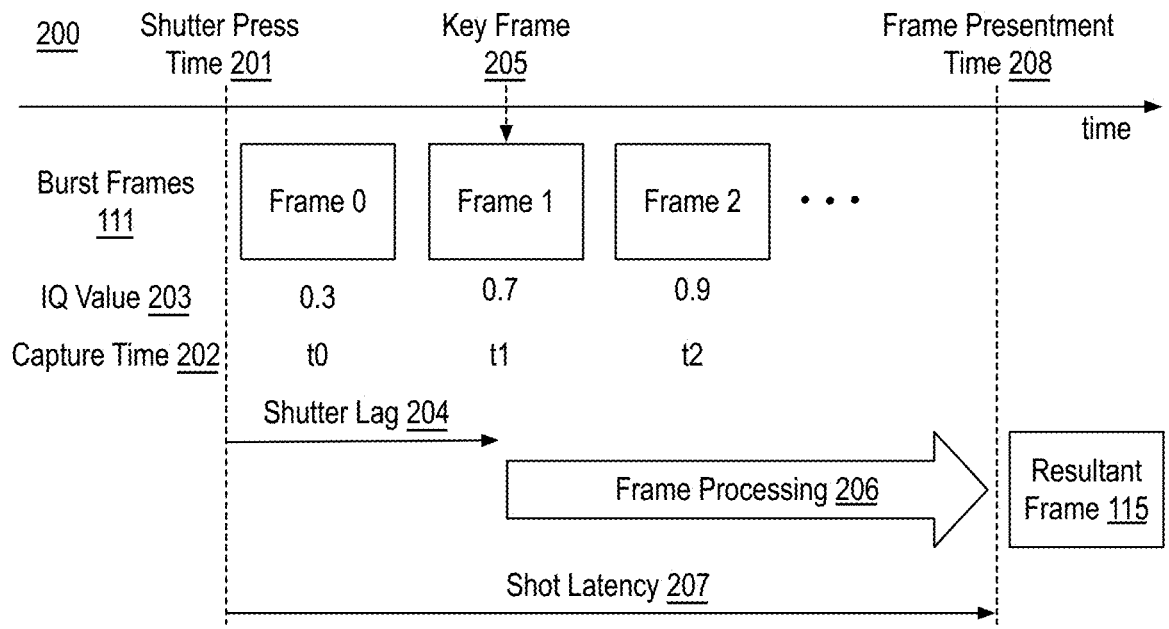
FIG. 2 illustrates an example timing diagram for a burst image capture and key frame selection.

FIG. 2 illustrates an example timing diagram 200 for a burst image capture and key frame selection, arranged in accordance with at least some implementations of the present disclosure. For example, burst frames 111 may be captured using a handheld camera such that some of burst frames 111 are more blurred than others due to, for example, motion blur, which may cause lower image quality for some of burst frames 111 relative to others. In FIG. 2, three burst frames 111 are illustrated and labeled frame 0, frame 1, frame 2 such that frames 0, 1, and 2 are in temporal order across time. As discussed, burst frames 111 may include any number of successively captured frames. For example, the three burst frames 111 illustrated in FIG. 2 may be the first three burst frames of any number of burst frames. For example, at a shutter press time 201, a burst image capture may be initiated by a user through depression of a shutter button, tapping an interactive display, etc. In response, burst frames 111 are captured. In the illustrated example, frame 1 of burst frames 111 is selected as key frame 205 for the sake of discussion. Although illustrated with respect to all of burst frames 111 being attained after shutter press time 201, in some embodiments, one or more of burst frames 111 may be attained before shutter press time 201. For example, in some systems, frames before the shutter button release moment (e.g., shutter press time 201) may be present in memory and such frame(s) may be used as one or more of burst frames 111. In such examples, a frame from before shutter press time 201 may have a shutter lag component (e.g., SLC 314) generated based on an absolute value of the time the frame was attained before shutter press time 201.

For example, each of burst frames 111 are captured at a particular capture time 202 such that frame 0 is captured at time t0, frame 1 is captured at time t1, frame 2 is captured at time t2 and so on. For each of burst frames 111, a shutter lag 204 may be defined as a difference between the capture time 202 corresponding thereto and shutter press time 201 (tS). For example, a user may desire for resultant frame 115 to match the image viewed by the user at the moment the shutter was depressed and any lag (particularly if there is a change in the scene) may be undesirable to the user. Furthermore, an image quality (IQ) measure or value 203 is determined for each of burst frames 111 as discussed herein. In the illustrated example, IQ values 203 are normalized between zero and one and frame 0 has an IQ measure of 0.3, frame 1 has an IQ measure of 0.7, and frame 2 has an IQ measure of 0.9. For example, in generating resultant frame 115, a higher image quality may be achieved when a higher image quality key frame is selected. In addition, depending on the key frame selected, the user may perceive a burst image processing latency or shot latency 207 that may be defined as a difference between a frame presentment time 208 (e.g., the time resultant frame 115 is presented to a user) and shutter press time 201 (tS). In some embodiments, frame processing 206 may begin when the key frame is selected (e.g., at the selection of key frame 205) and remaining frames are not scored. For example, frame processing 206 may be performed concurrently with image capture of subsequent frames (e.g., frame 2 and s on). Such techniques may be characterized as on-the-fly key frame selection. In other embodiments, key frame selection is performed after capture and evaluation of all of burst frames 111. In such embodiments, shot latency 207 may be substantially constant between burst frames 111.

Figure 3:
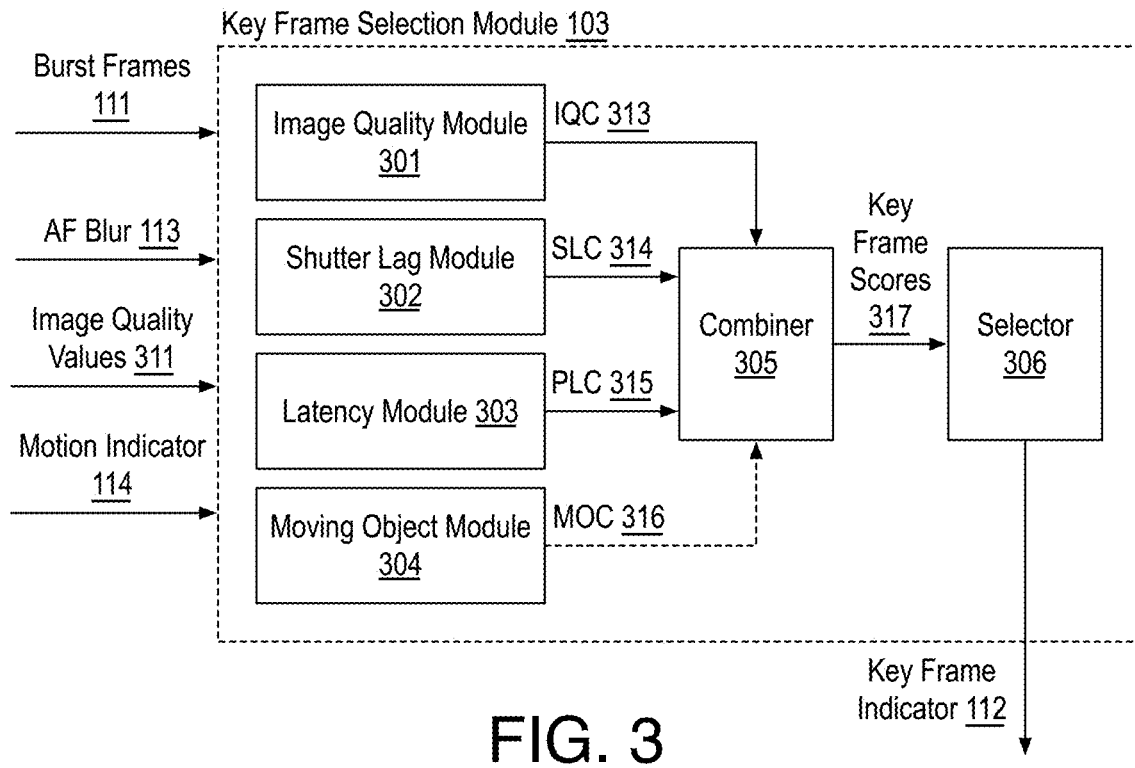
FIG. 3 illustrates an example key frame selection module.

FIG. 3 illustrates an example key frame selection module 103, arranged in accordance with at least some implementations of the present disclosure. As shown, key frame selection module 103 may receive burst frames 111, AF blur 113, image quality (IQ) values 311, and a motion indicator 114. As discussed, burst frames 111 may include metadata including capture times 202, frame indices, etc. or such metadata as may be received in another signal. Furthermore, AF blur 113 for a frame may be used as an IQ value for the frame or another IQ value, such as sharpness measure or the like, may be used. For example, a sharpness measure may offer the advantage of a more accurate measure of the sharpness of the frame at the cost of increased processing complexity and time while use of AF blur 113 may offer the advantage of increased speed and reduced complexity (as AF blur is already generated for use in autofocus calculations) at the cost of reduced accuracy.

Key frame selection module 103 may include an image quality module 301, a shutter lag module 302, a latency module 303, a moving object module 304, a combiner 305, and a selector 306. Image quality module 301 receives an IQ value for a frame and translates it to an image quality component (IQC) 313. Shutter lag module 302 receives a capture time value (or a temporal frame number in the burst) for a frame and translates it to a shutter lag component (SLC) 314. Similarly, latency module 303 receives a capture time value (or a temporal frame number in the burst) for a frame and translates it to a burst image processing latency component (PLC) 314. In addition, moving object module 304 may, if motion is indicated, determine a moving object component (MOC) 316 based on a temporal frame number in the burst for a frame, as is discussed further herein below. As used herein, the term temporal frame number in the burst for a frame or temporal frame number or, simply, frame index, is the number of the frame in the temporal frame count of the burst. For example, the first frame in the burst may be labeled frame 0 (or 1), the second frame may be labeled frame 1 (or 2), and so on such that each frame of burst frame has a temporal frame number in the burst. Such a temporal frame number for a frame may be used to determine a lag from the previous frame in the burst (e.g., using frame capture rate), for example.

Also, as discussed herein, key frame selection may be made on-the-fly such that, at any frame in the burst, key frame scoring may stop, a key frame may be selected and subsequent frames are not evaluated. For example, selector 306 may indicate to image quality module 301, shutter lag module 302, latency module 303, moving object module 304, and combiner 305 that a key frame has been selected and score evaluation for subsequent frames of the burst may be bypassed or stopped.

As discussed, image quality module 301 receives an IQ value for a frame and translates it to an image quality component (IQC) 313. IQC 313 may be any value representative of image quality and, in particular, a measure of image quality for the evaluation of a key frame selection in burst image processing. In an embodiment, IQC 313 is a value between zero and one. Image quality module 301 may translate the IQ value for a frame to an IQC 313 value using any suitable technique or techniques. In an embodiment, image quality module 301 translates the IQ value for a frame to an IQC 313 value using a monotonically increasing function of the IQ value.

Figure 4:
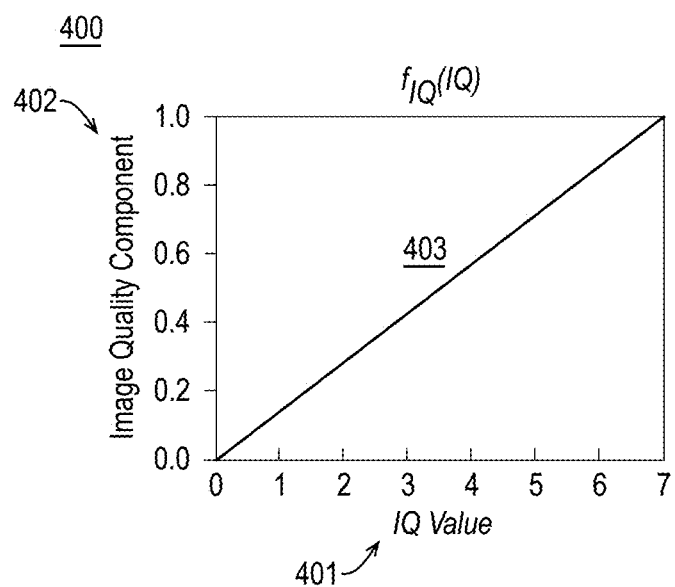
FIG. 4 illustrates an example function for translating an image quality value for a frame to an image quality component.

FIG. 4 illustrates an example function 400 for translating an image quality value 401 for a frame to an image quality component 402, arranged in accordance with at least some implementations of the present disclosure. As shown, function 400 (labeled as $f_{IQ}(IQ)$) may provide, for an image quality (IQ) value 401 of a frame an image quality component 402 for the frame based on applying a curve 403 representative of function 400. As shown, in an embodiment, function 400 may include a monotonically increasing function such that for larger IQ values 401, function 400 provides larger image quality component values. In an embodiment, function 400 is a monotonically increasing linear function, as shown. However, function 400 may be any monotonically increasing function. As is discussed further herein, function 400 may translate a particular IQ value 401 to a corresponding image quality component value for use in a key frame score.

With reference to FIG. 3, shutter lag module 302 receives a time of image capture for a frame, a shutter lag value for a frame (e.g., a difference between the time of image capture for the frame and the time of shutter actuation for the burst image capture) or a temporal frame number for a frame and translates it to a shutter lag component (SLC) 314. SLC 314 may be any value representative of shutter lag and, in particular, a measure of shutter lag for the evaluation of a key frame selection in burst image processing. In an embodiment, SLC 314 is a value between zero and one. Shutter lag module 302 may translate a shutter lag value or a temporal frame number for a frame to an SLC 314 value using any suitable technique or techniques. In an embodiment, shutter lag module 302 translates a temporal frame number for a frame to an SLC 314 value using a monotonically decreasing function of the temporal frame number value.

Figure 5:
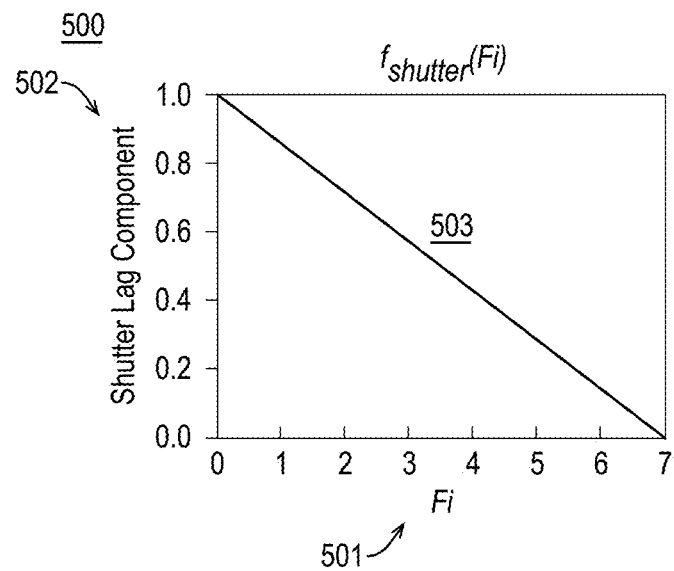
FIG. 5 illustrates an example function for translating a temporal frame number for a frame to a shutter lag component.

FIG. 5 illustrates an example function 500 for translating a temporal frame number 501 for a frame to a shutter lag component 502, arranged in accordance with at least some implementations of the present disclosure. As shown, function 500 (labeled as $f_{shutter}(Fi)$) may provide, for a temporal frame number (Fi) value 501 of a frame, a shutter lag component 502 for the frame based on applying a curve 503 representative of function 500. As discussed, temporal frame number value 501 is provided by numbering each frame in a burst in temporal order. As shown, in an embodiment, function 500 may include a monotonically decreasing function such that for larger temporal frame number values 501, function 500 provides smaller image shutter lag component values. That is, as temporal frame number increases, the result is a negative impact on user experience with respect to shutter lag. In an embodiment, function 500 is a monotonically decreasing linear function, as shown. However, function 500 may be any monotonically decreasing function. As is discussed further herein, function 500 may translate a particular temporal frame number value 501 to a corresponding shutter component value for use in a key frame score. In other embodiments, function 500 may be a monotonically decreasing function that translates a shutter lag value for a frame to a shutter lag component 502. Such a monotonically decreasing function may be any monotonically decreasing function such as a linear monotonically decreasing function.

Again with reference to FIG. 3, latency module 303 receives a time of image capture for a frame, a processing latency value for a frame (e.g., a difference between the expected time of presentment of a resultant image to a user and the time of shutter actuation for the burst image capture) or a temporal frame number for a frame and translates it to a processing latency component (PLC) 315. PLC 315 may be any value representative of processing lag and, in particular, a measure of processing lag for the evaluation of a key frame selection in burst image processing. In an embodiment, PLC 315 is a value between zero and one. Latency module 303 may translate a processing latency value or a temporal frame number for a frame to a PLC 315 value using any suitable technique or techniques. In an embodiment, latency module 303 translates a temporal frame number for a frame to a PLC 315 value using a monotonically decreasing function of the temporal frame number value.

Figure 6:
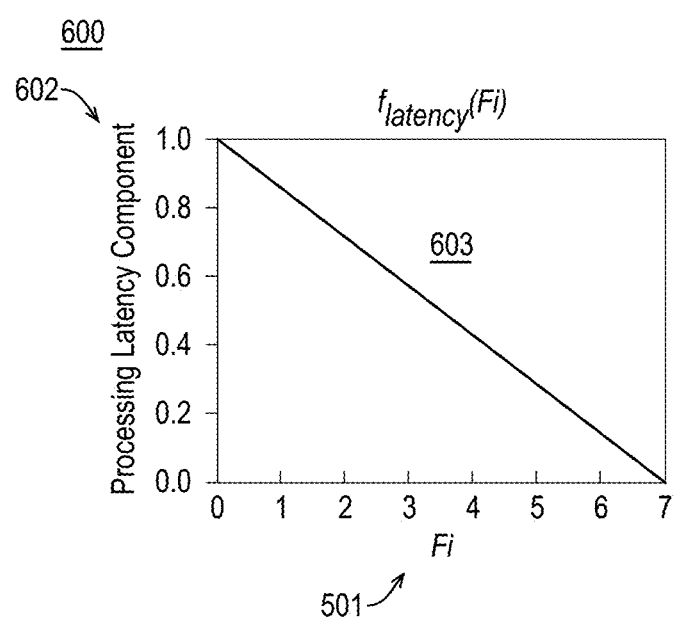
FIG. 6 illustrates an example function for translating a temporal frame number for a frame to a shutter lag component.

FIG. 6 illustrates an example function 600 for translating a temporal frame number 501 for a frame to a shutter lag component 602, arranged in accordance with at least some implementations of the present disclosure. As shown, function 600 (labeled as $f_{latency}(Fi)$) may provide, for a temporal frame number (Fi) value 501 of a frame, a shutter lag component 502 for the frame based on applying a curve 603 representative of function 600. As discussed, temporal frame number value 501 is provided by numbering each frame in a burst in temporal order. As shown, in an embodiment, function 600 may include a monotonically decreasing function such that for larger temporal frame number values 501, function 600 provides smaller latency component values. That is, as temporal frame number increases, the result is a negative impact on user experience with respect to processing latency. In an embodiment, function 600 is a monotonically decreasing linear function, as shown. However, function 600 may be any monotonically decreasing function. As is discussed further herein, function 600 may translate a particular temporal frame number value 501 to a corresponding latency value for use in a key frame score. In other embodiments, function 600 may be a monotonically decreasing function that translates an expected latency value for a frame to a shutter lag component 602. Such a monotonically decreasing function may be any monotonically decreasing function such as a linear monotonically decreasing function.

Returning again to FIG. 3, image quality module 301 generates IQC 313. As discussed, image quality module 301 may apply a monotonically increasing function to an IQ value or metric for a frame. The IQ value may be any suitable measure of IQ such as image sharpness, edge strength, inverse of camera motion (as provided by a motion vector field or gyroscopic data), etc. In an embodiment, image quality module 301 applies a function as $f_{IQ}(IQ(i_{keyframe}))$ where $i_{keyframe}$ indicates a temporal frame number of a potential key frame, $IQ(i_{keyframe})$ is the IQ value of the frame, and $f_{IQ}(IQ(i_{keyframe}))$ is a function that translates the IQ value to an image quality component (IQC 313) of a key frame score.

Furthermore, shutter lag module 302 may apply a monotonically decreasing function to a shutter lag value for a frame. For example, ideal shutter lag would be zero. The shutter lag value may be determined using the temporal frame number of a potential key frame ($i_{keyframe}$). In an embodiment, shutter lag module 302 applies a function as $f_{shutterlag}(t_{shutterlag} = t_{keyframe}(i_{keyframe}) - t_{shutter})$ where $t_{shutterlag}$ is the shutter lag of the potential key frame, which may be expressed as the difference between $t_{keyframe}$ (i.e., the capture time of the potential key frame) and $t_{shutter}$ (i.e., the actuation time of the shutter), and $f_{shutterlag}$ is a function that translates the shutter lag time value to a shutter lag component (SLC 314) of a key frame score. In an embodiment, $t_{shutterlag}$ is determined using the temporal frame number and shutter lag module 302 applies a function as $f_{shutterlag}(i_{keyframe})$ to determine the shutter lag component of a key frame score.

In addition, latency module 303 may apply a monotonically decreasing function to a processing latency value for a frame. For example, ideally, latency time would be minimized. The shutter lag value may be determined using the temporal frame number of a potential key frame ($i_{keyframe}$), which may be characterized as $i_{selection}$. In an embodiment, latency module 303 applies a function as $f_{latency}(t_{latency} = t_{selection}(i_{selection}) + t_{processing} - t_{shutter})$ where $t_{latency}$ is the latency time of the potential key frame, which may be expressed as $t_{selection}(i_{selection})$ (i.e., the selection time of the key frame) plus $t_{processing}$ (i.e., the time needed to process images to generate and display a resultant image, which may be assumed to be a constant) minus $t_{shutter}$ (i.e., the actuation time of the shutter), and $f_{latency}$ is a function that translates the latency time value to a latency component of a key frame score. In an embodiment, $t_{latency}$ is determined using the temporal frame number and latency module 303 applies a function as $f_{latency}(i_{selection})$ to determine the processing latency component (PLC 315) of a key frame score. In some embodiments, a key frame is selected on-the-fly. In other embodiments, a key frame is selected after evaluating all potential key frames. In such embodiments, the latency component may be constant across potential key frames.

As shown, combiner 305 receives one or more of IQC 313, SLC 314, PLC 315, and MOC 316 (as discussed further herein) for each of burst frames 111 and combiner 305 generate key frame scores 317 for at least some of burst frames 111. For a particular frame of burst frames 111, combiner 305 may generate a key frame score 317 based on one or more of IQC 313, SLC 314, PLC 315, and MOC 316 using any suitable technique or techniques. In an embodiment, one or more of IQC 313, SLC 314, PLC 315, and MOC 316 are summed to generate a key frame score 317. In an embodiment, one or more of IQC 313, SLC 314, PLC 315, and MOC 316 are multiplied to generate a key frame score 317. In an embodiment, one or more of IQC 313, SLC 314, PLC 315, and MOC 316 are weighted and summed to generate a key frame score 317 as shown in Equation (1) as follows:

$$f_{combined}(IQ(i_{keyframe}), i_{keyframe}, i_{selection}) = w_1 f_{IQ}(IQ(i_{keyframe})) + w_2 f_{shutterlag}(i_{keyframe}) + w_3 f_{latency}((i_{selection})) \quad (1)$$

where $f_{combined}$ is the key frame score 317 for a potential key frame, $w_1$ is an IQ component weight or factor, $w_2$ is a shutter lag component weight or factor, and $w_3$ is a burst image processing latency component weight or factor. It is noted the other expressions in Equation (1) have been discussed above such that $f_{IQ}$ provides an IQ component, $f_{shutterlag}$ provides a shutter lag component, and $f_{latency}$ provides a burst image processing latency component of the key frame score 317. Weights $w_1$, $w_2$, and $w_3$ and may be any suitable values. In an embodiment, the weights are empirically generated based on user experience.

Furthermore, the weights may be used to implement various burst optimization modes. For example, such modes may be presented to a user for selection or received by an application or the like. Such modes may include a high image quality mode (or IQ prioritization mode), a fast operation mode, and a default mode. For example, the high image quality mode may have a higher IQ component weight than the fast operation mode while the fast operation mode has higher shutter lag component and/or latency component weights. In an embodiment, the default mode has empirically determined or optimized values while other modes vary from the default values.

Selector 306 receives key frame scores 317 and selector 306 selects a key frame using key frame scores 317 and provides key frame indicator 112 to indicate the selected key frame for use as the basis of burst image processing. For example, key frame indicator 112 may be a temporal frame number or index of the selected key frame. Selector 306 may select the key frame using any suitable technique or techniques. In an embodiment, selector 306 selects the frame corresponding to the maximum of key frame scores 317.

As discussed, in some embodiments, selector 306 may select a key frame on-the-fly such that a key frame may be selected after the evaluation of any particular potential key frame and, once the selection is made, evaluation of subsequent potential key frames is bypassed or skipped and burst image processing is immediately started using the selected key frame. For example, burst image processing may be begun prior to all of the frames being captured such that burst image processing and one or more image captures for burst images 111 are performed in parallel.

Figure 7:
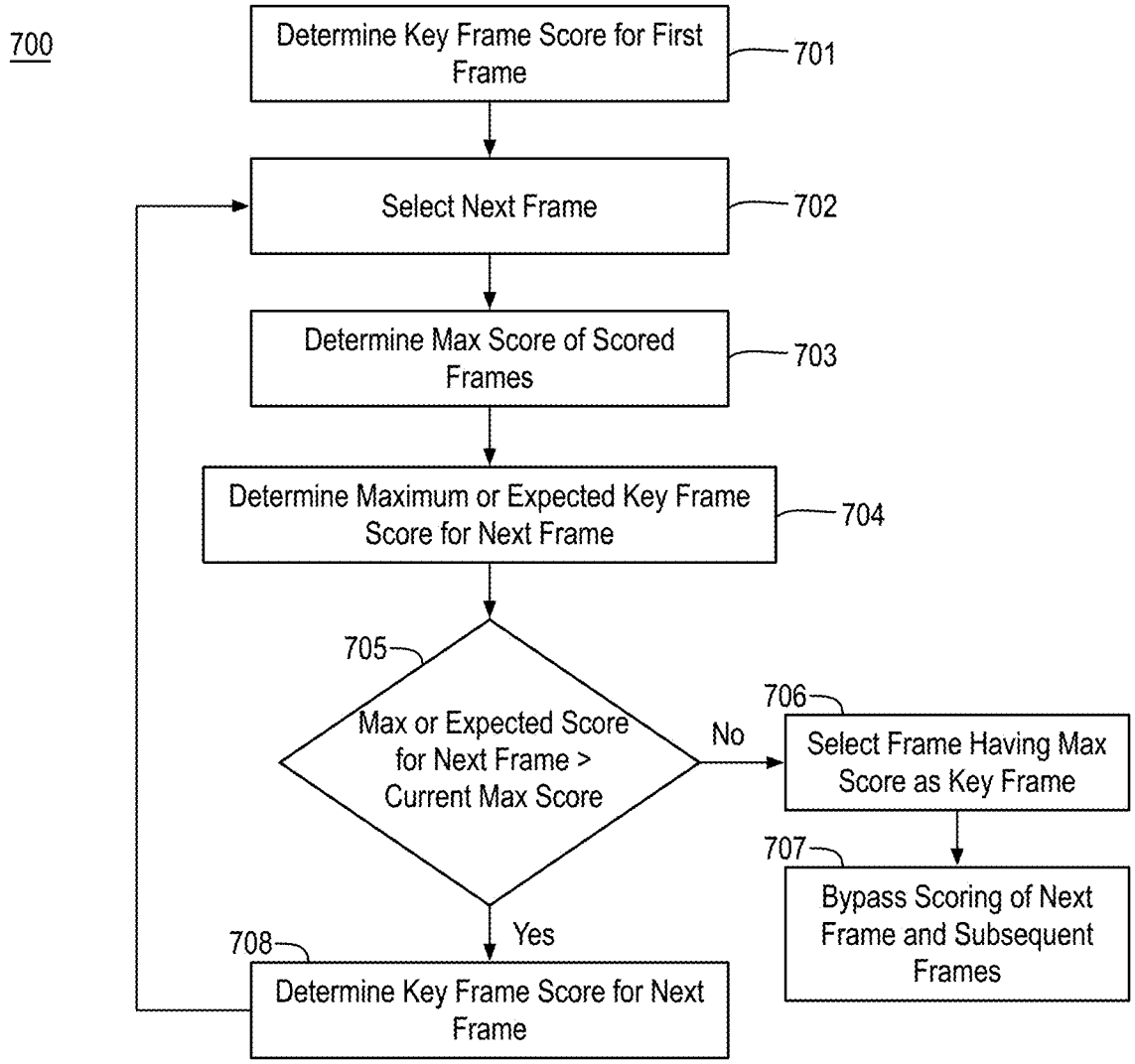
FIG. 7 illustrates an example process for performing on-the-fly key frame selection.

FIG. 7 illustrates an example process 700 for performing on-the-fly key frame selection, arranged in accordance with at least some implementations of the present disclosure. Process 700 may include one or more operations 701-708 as illustrated in FIG. 7. Process 700 or portions thereof may be performed by any device or system discussed herein to perform on-the-fly key frame selection. Process 700 or portions thereof may be repeated for any number of burst image captures.

Process 700 begins at operation 701, where a key frame score is determined for a first frame of a multi-frame burst image capture. For example, the key frame score may be generated by combiner 305 (and pertinent modules 301, 302, 303, 304). The key frame score for the first frame may be determined using any suitable technique or techniques discussed herein such as those discussed with respect to Equation (1). Processing continues at operation 702, where a next frame in the temporal sequence of the multi-frame burst image capture is selected, and at operation 703, where a maximum key frame score for the already scored frames is determined. For example, operations 702 and 703 may be performed by selector 306. At a first iteration, the maximum key frame score is the key frame score of the first frame.

Processing continues at operation 704, where a maximum key frame score or an expected key frame score for the next frame selected at operation 702 is determined. For example, the maximum key frame score or an expected key frame score for the next frame selected at operation 702 may be generated by selector 306. In an embodiment, a maximum possible key frame score for the next frame selected at operation 702 is determined. For example, a maximum possible image quality component (i.e., 1 if the component ranges from 0 to 1) for the next frame may be assumed for the next frame and actual shutter lag and processing latency components may be determined as discussed herein. The components may be combined using the same technique implemented at operation 701 to generate a maximum possible key frame score for the next frame. In an embodiment, an expected key frame score for the next frame is generated. For example, instead of using a maximum possible image quality component an expected image quality component may be generated using probabilistic technique or the like as discussed further herein.

In either case, processing continues at decision operation 705, where a determination is made as to whether the maximum key frame score for the already scored frames determined at operation 703 is compared to the maximum or expected key frame score for the next frame determined at operation 704. As shown, if the maximum or expected key frame score for the next frame is greater than the maximum key frame score for the already scored frames, processing continues at operation 708, where a key frame score is determined for the next frame selected at operation 702. If not, processing continues at operation 706, where the frame having the maximum key frame score for the already scored frames is selected as the key frame. For example, operations 704 and 705 may be performed by selector 306 and operation 708 may be performed by combiner 305 (and pertinent modules 301, 302, 303, 304).

For example, if the maximum key frame score for the next frame cannot exceed the current maximum key frame score of the already scored frames, the maximum has been achieved and scoring of subsequent frames (e.g., remaining frames) can be bypassed as shown at operation 707. Similarly, if the expected key frame score for the next frame does exceed the current maximum key frame score of the already scored frames, it is likely the maximum has been achieved and scoring of subsequent frames (e.g., remaining frames) can be bypassed, again, as shown at operation 707.

However, when the maximum key frame score for the next frame may exceed the current maximum key frame score of the already scored frames or the expected key frame score for the next frame is deemed likely to exceed the current maximum key frame score of the already scored frames, processing continues with the determination of the (actual) key frame score for the next frame at operation 708 and continued processing at operations 702-708 as discussed until a next frame cannot or is unlikely to exceed the current maximum key frame score of the already scored frames or all frames have been processed. For example, if no next frame is available at operation 702, processing may continue at operation 706, where a key frame is selected and processing may end.

As discussed, process 700 provides for on-the-fly key frame selection. For example, key frame selection may provide for key frame scoring optimization in 3 dimensions (i.e., IQ component, shutter lag component, and latency component) or 4 dimensions (i.e., adding a moving object component). After the scoring of an $i^{th}$ frame, at operation 703, a best key frame from the already observed frames may be selected (e.g., those having an index [0 . . . i] as shown in Equation (2):

$$f_{current} = \max_{k=0...i}(w_1 f_{IQ}(IQ(k)) + w_2 f_{shutterlag}(k)) + w_3 f_{latency}(i)) \qquad (2)$$

where $f_{current}$ is the maximum key frame score of the burst frames that have been scored and k is a frame index. As shown, $f_{current}$ may be provided as discussed with respect to Equation (1). It is noted that the latency component is a function of selection at the time or index of the current frame (i.e., current selection time) while the image quality and shutter lag components are functions index of the key frame corresponding to the maximum score. That is, as the key frame selection is delayed, each frame is penalized with respect to latency. Such scoring (or modified scoring) of frames as processing continues is performed at operation 703.

At operation 704, a maximum or expected key frame score for frame i+1 is determined. In an embodiment, a maximum key frame score for frame i+1 is determined as shown in Equation (3):

$$f_{next\_best\_case} = w_1 f_{IQ}(IQ_{max}) + w_2 f_{shutterlag}(i+1) + w_3 f_{latency}(i+1) \qquad (3)$$

where $f_{next\_best\_case}$ is the maximum possible key frame score for the next frame. As shown, in determining the maximum possible key frame score for the next frame, the IQ component is a function of the maximum possible IQ value (i.e., $IQ_{max}$) and the shutter lag and latency components are functions of the index value for the next frame.

As discussed, if the maximum possible key frame score for the next frame (i.e., $f_{next\_best\_case}$) cannot exceed the maximum key frame score of the already scored frames, the optimal frame has already been evaluated and the best frame from the already scored frames (e.g., frame k) is selected as the key frame. For example, the on-the-fly key frame selection may include the steps of 1) for the current frame (i), determine IQ (e.g., a sharpness metric) and 2) based on the all observed IQ values, predict whether a higher combined key frame score (e.g., user satisfaction value) may be achieved by waiting for the next frame (i+1) as discussed. For example, if, $f_{next\_best\_case} \leq f_{current}$: select the key frame from the previous frames that maximizes key frame score and begin burst image processing (e.g., fusion processing), else wait for next frame and repeat processing.

Figure 8:
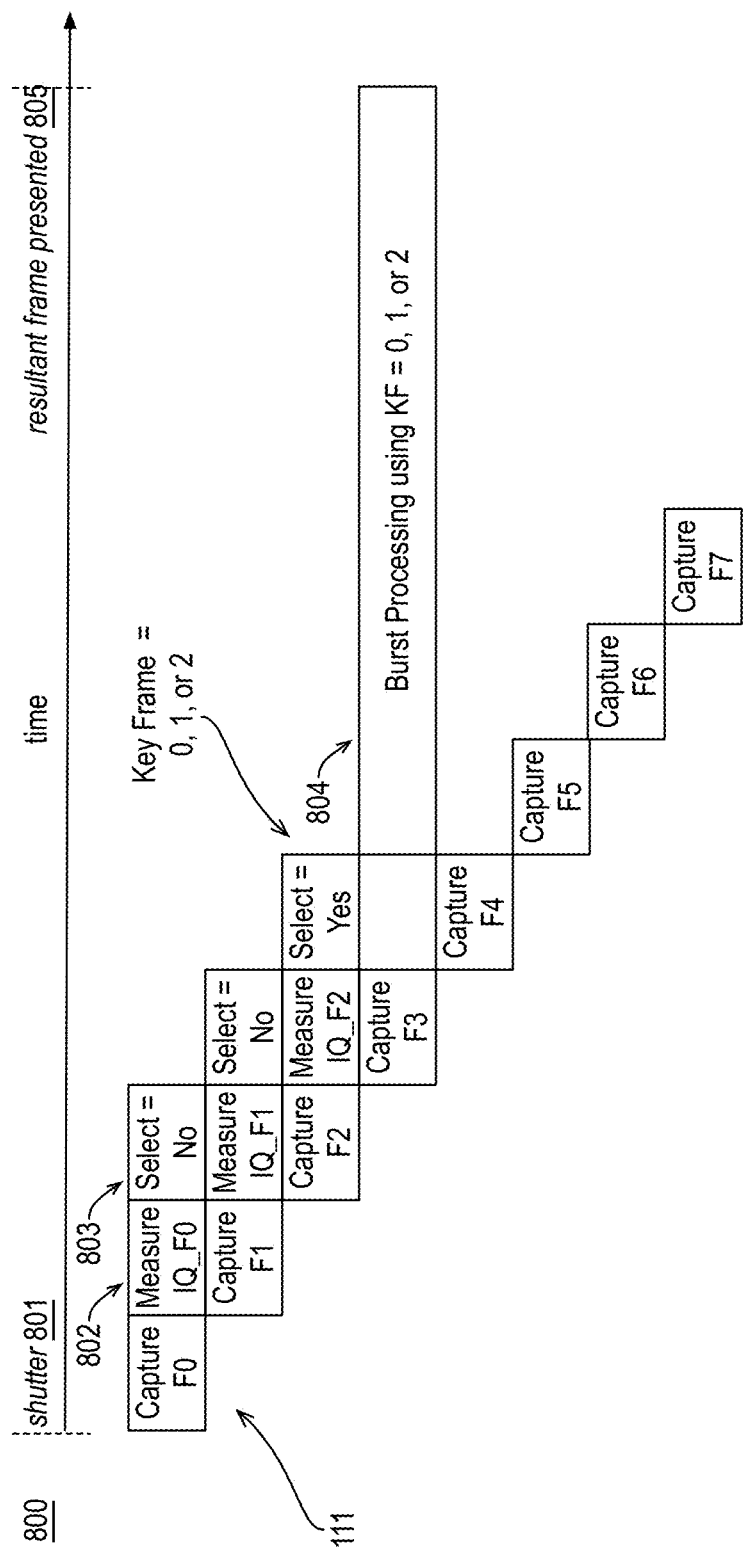
FIG. 8 illustrates an example timing diagram for on-the-fly key frame selection for burst image processing.

FIG. 8 illustrates an example timing diagram 800 for on-the-fly key frame selection for burst image processing, arranged in accordance with at least some implementations of the present disclosure. For example, burst frames 111 may be captured after shutter actuation 801, as illustrated by capture F0, capture F1, capture F2, and so on. After each burst frame is captured, an IQ measurement 802 is made for the burst frame as illustrated by Measure IQ_F0, Measure IQ_F1, and so on. The IQ measurement may be any suitable measurement discussed herein. After IQ measurement 802, a selection determination 803 is made as discussed with respect to operation 705 such that an indicator is provided as to whether a key frame selection is made without evaluating the particular captured frame as illustrated with respect to Select=No or Select=Yes.

In the illustrative example, a key frame is selected after capture of and evaluation of frames 0-2. For example, F0 is captured, an IQ of F0 is determined, and a key frame score for F0 is generated. While the IQ of F0 is determined (e.g., in parallel), F1 is captured and a determination as to whether F1 can be selected (or is likely to be selected) as a key frame over F0 is made. In this example, F1 may be selected as the key frame so Select is set to No. After the capture of F1, IQ of F1 is determined and a key frame score for F1 is generated. While the IQ of F1 is determined (e.g., in parallel), F2 is captured and a determination as to whether F2 can be selected (or is likely to be selected) as a key frame over the best of F0 and F1 is made. In this example, F2 may be selected as the key frame so Select is again set to No. After the capture of F2, IQ of F2 is determined and a key frame score for F2 is generated. While the IQ of F2 is determined (e.g., in parallel), F3 is captured and a determination as to whether F3 can be selected (or is likely to be selected) as a key frame over the best of F0, F1, and F2 is made. In this example, F3 cannot (or is unlikely to) be selected as the key frame (e.g., a maximum possible key frame score of F3 cannot exceed the maximum of F0, F1, and F2 or a probable key frame score of F3 is unlikely to exceed the maximum of F0, F1, and F2) and Select is set to Yes.

The best key frame of F0, F1, and F2 is the selected as the key frame and burst processing 804 is begun using the selected key frame immediately after selection and ends when the resultant frame is presented 805 (e.g., via a display). As shown, such burst processing is performed in parallel with the image capture of at least some of burst frames 111 (i.e., frames F5-F7 in the illustrated example). Such processing may provide for reduced latency and enhanced user experience.

As discussed, in some embodiments, an expected key frame score for a next frame (e.g., frame i+1) is used to determine whether the next frame will be evaluated. For example, using a maximum possible key frame score for the next frame may not be aggressive enough in making an on-the-fly key frame selection and bypassing additional processing. Using an expected key frame score may improve processing efficiency. The expected key frame score for the next frame may be generated using any suitable technique or techniques. In an embodiment, the expected key frame score for the next frame may be generated using a probabilistic technique. For example, in a probabilistic technique, previously determined IQ values for previous frames are used to predict the IQ value of the next frame (which is in turn used to determine an IQ component). In an embodiment, the expected key frame component for the next frame is generated as shown in Equation (4):

$$f_{IQ\_predicted} = \int_{IQ_{i+1}} f_{IQ}(IQ_{i+1}) p(IQ_{i+1}|IQ_i, \ldots, IQ_0) \quad (4)$$

where $f_{IQ\_predicted}$ is the expected key frame component for the next frame, $f_{IQ}(IQ_{i+1})$ is the IQ component function as discussed above and $p(IQ_{i+1}|IQ_i, \ldots, IQ_0)$ is a predictive probabilistic model (e.g., that provides a probability distribution of $IQ_{i+1}$ given the observation of $IQ_i, \ldots, IQ_0$) such as a conditional probabilistic density function. For example, the predictive model may be implemented by a neural network or an auto regression (AR) model such as a Kalman filter. As shown, by integrating over the probability distribution, an expected key frame component for the next frame based on the distribution is provided.

As discussed, key frame selection may be based on an IQ component, a shutter lag component, and a processing latency component. In addition, with reference to FIG. 1, a moving object component may be included when motion is detected for burst frames 111. For example, when scene 121 has moving objects such as large moving objects across burst frames 111, some parts of burst frames 111 are occluded during the movement. As occluded parts are observed in fewer of burst frames 111 than the other parts of scene 121, noise reduction will be less. In resultant frame 115 this may be observed as additional noise at the sides of moving objects.

Figure 9:
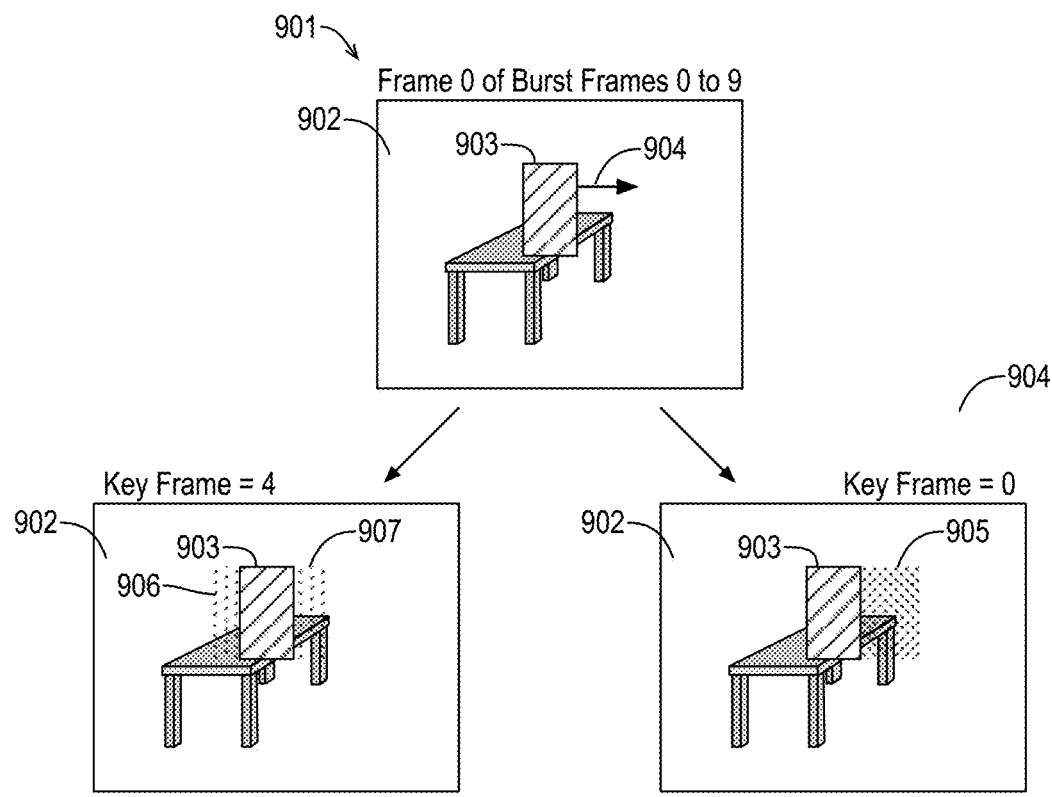
FIG. 9 illustrates an example impact of key frame selection on noise around a moving object.

FIG. 9 illustrates an example impact of key frame selection on noise around a moving object, arranged in accordance with at least some implementations of the present disclosure. As shown in FIG. 9, a scene 901 as captured by burst frames 111 or the like may have a background 902 and a moving object 903, such that moving object is moving in a direction 904 during image capture of burst frames 111. As shown, when frame 0 of burst frames 111 is selected as a key frame, more frames (and potentially all frames) have occlusion along direction 904 of moving object 903 such that a noisy region 905 is generated. Alternatively, when frame 4 of burst frames 111 is selected as a key frame, the occlusion due to moving object 903 is balanced across both sides of moving object 903 such that noisy regions 906, 907 have substantially less noise than noisy region 905 and such that the noisy regions 906, 907 are advantageously balanced to both sides of moving object 903. In the case of one or moving objects, it may be advantageous to select a middle frame of burst frames 111 as a key frame for burst image processing.

Returning to FIG. 1, as shown motion detector 105 may detect motion either prior to burst frames 111, during burst frames 111, or both. Motion detector 105 may detect motion using any suitable technique or techniques such as analyzing motion vectors generated by motion detector 105 or a motion estimation module (not shown), by monitoring digital video stabilization (DVS) statistic vectors from a DVS module (not shown), etc. When motion is detected, motion detector 105 generates motion indicator 114, which indicates motion exists with respect to burst frames 111. In an embodiment, motion indicator 114 is only generated when the detected motion is large motion of large objects such as global motion, motion of an object larger than about one eighth of the frame size, etc. In an embodiment, the object motion must be not less than half the frame size. In an embodiment, the motion must also be large such a greater than 5 pixels per frame.

Turning now to FIG. 3, when motion is detected, moving object module 304 generates moving object component (MOC) 316 for inclusion in the generation of key frame scores 317. For example, moving object module 304 may receive a temporal frame number for a frame of burst frames 111 and translate it to MOC 316. MOC 316 may be any value representative of n impact of a moving object on burst image processing and, in particular, a measure of the impact of a moving object for the evaluation of a key frame selection in burst image processing. In an embodiment, MOC 316 is a value between zero and one. Moving object module 304 may translate a temporal frame number for a frame to an MOC 316 value using any suitable technique or techniques. In an embodiment, moving object module 304 translates a temporal frame number for a frame to an MOC 316 value using a concave function of the temporal frame number value.

Figure 10:
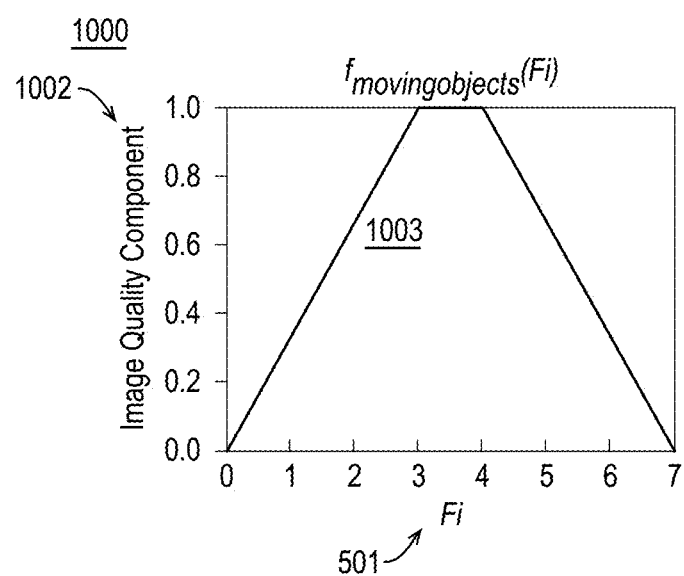
FIG. 10 illustrates an example function for translating a temporal frame number for a frame to a moving object component.

FIG. 10 illustrates an example function 1000 for translating a temporal frame number 501 for a frame to a moving object component 1002, arranged in accordance with at least some implementations of the present disclosure. As shown, function 1000 (labeled as $f_{movingobjects}(Fi)$) may provide, for a temporal frame number (Fi) value 501 of a frame, a moving object component 1002 for the frame based on applying a curve 1003 representative of function 1000. As discussed, temporal frame number value 501 is provided by numbering each frame in a burst in temporal order. As shown, in an embodiment, function 1000 may include a concave function such that for smaller and larger temporal frame number values 501, function 500 provides smaller moving object component values 1002 while temporal frame number values 501 between the maximum and minimum temporal frame number values 501 provide larger (and maximum) moving object component values 1002. In an embodiment, moving object function 1000 provides a first component value for a first frame number, a second component value for a second frame number, and a third component value for a third frame number such that the second frame number is temporally subsequent to the first frame number and the third frame number is temporally subsequent to the second frame number and such that the second component value is greater than both the first and third component values. As is discussed, function 1000 may translate a particular temporal frame number value 501 to a corresponding moving object component value for use in a key frame score.

As discussed, combiner 305 receives one or more of IQC 313, SLC 314, PLC 315, and MOC 316 for each of burst frames 111 and combiner 305 generate key frame scores 317 for at least some of burst frames 111. When object motion is detected, for a particular frame of burst frames 111, combiner 305 may generate a key frame score 317 based on IQC 313, SLC 314, PLC 315, and MOC 316 using any suitable technique or techniques such as summing or multiplying IQC 313, SLC 314, PLC 315, and MOC 316. In an embodiment, IQC 313, SLC 314, PLC 315, and MOC 316 are weighted and summed, in analogy to Equation (1) to generate a key frame score 317 as shown in Equation (5) as follows:

$$f_{combined}(IQ(i_{keyframe}), i_{keyframe}, i_{selection}) = w_1 f_{IQ}(IQ(i_{keyframe})) + w_2 f_{shutterlag}(i_{keyframe}) + w_3 f_{latency}(i_{selection}) + w_4 f_{movingobject}(i_{keyframe}) \quad (5)$$

where $w_4$ is a moving object component weight or factor and $f_{movingobject}$ is the moving object component as discussed. Weights $w_1$, $w_2$, $w_3$, and $w_4$ and may be any suitable values. In an embodiment, the weights are empirically generated based on user experience.

Selector 306 may receive key frame scores 317 including MOC 316 and process them as discussed herein. In an embodiment, motion is detected among burst frames 111 such that MOC 316 may not be used in on-the-fly processing. In an embodiment, on-the-fly processing may be halted in response to motion indicator 314 and MOC 316 may be included in the key frame selection. In another embodiment, motion is detected prior to burst frames 111 (e.g., using frames prior to burst frames) and assumed to continue during burst frames 111. In such embodiments, MOC 316 is included in the on-the-fly processing discussed with respect to FIG. 7. For example, at operations 701, 704, and 708, MOC 316 may be included (along with IQC 313, SLC 314, and PLC 315) in the determination of key frame scores for the frames and the maximum or expected key frame score for a next frame. As will be appreciated, inclusion of MOC 316 may encourage the delay of key frame selection until mid-burst frames of burst frames 111 are evaluated (please refer to FIG. 10).

With reference to FIG. 1, as discussed, in some embodiments, AF blur 113 may be used as an IQ value for each frame. In other embodiments, an image sharpness or the like may be used as the IQ value for each frame. For example, image sharpness may provide improved performance at the cost of increased complexity and processing time while AF blur 113 or another AF measure may provide for decreased complexity and processing time at the cost of reduced performance. For example, image statistics for autofocus such as AF blur 113 may be readily available. ISP 101 may apply horizontal filters implemented in hardware (not shown) for on-they-fly AF statistics calculation. For example, horizontal only filters are typically small and efficient to implement in hardware in contrast to filters with both vertical and horizontal support. Although blur due to out-of-focus is typically in all directions (such that a horizontal only filter is sufficient) and motion blur (which may cause low frame sharpness of a frame of burst frame 111) may be directional, the use of horizontal only filter blur is sufficient as a measure of image quality in burst imaging key frame selection. The use of horizontal filter only AF blur 113, for example, may provide a low cost and low latency time image quality measure for use by image quality module 301 in the generation of IQC 313.

Furthermore, as discussed, a gyroscope or other inertial sensors (e.g. accelerometers) may be used to generate an image quality measure. For example, an inverse of a measure of motion for a frame of burst frames 111 may be used as the image quality measure. For example, image quality module 301 may use an inverse of a motion measure from a gyroscope or accelerometer in the generation of IQC 313.

Additionally, multiple image quality measures may be used to generate a final image quality measure for use by image quality module 301 in the generation of IQC 313. In an embodiment, one or more of a sharpness measure, an inverse of a measure of motion, and AF blur may be combined to generate a final image quality measure. Such measures may be combined using any suitable technique or techniques. In an embodiment, an image quality value (e.g., a final image quality value) for a frame is generated by applying a linear quadratic estimation (such as a Kalman filter) to a sharpness value, a gyroscopic motion value, and an autofocus blur value for the frame. In an embodiment, a sharpness value, a gyroscopic motion value, and an autofocus blur value may be combined using a linear quadratic estimation (such as a Kalman filter) based on a model of camera shake. Such techniques may improve the robustness and quality of the IQ measure of the frame.

The techniques discussed herein improve imaging device efficiency by providing for improved burst imaging. For example, burst frames of a scene may be attained and combined to generate a resultant image that may be stored to memory, displayed to a user, etc. The described techniques improve the quality of the resultant image, enhance user performance with respect to shutter lag and processing latency, and improve the efficiency of the imaging device by providing efficient key frame selection with fewer computations and computation time.

Figure 11:
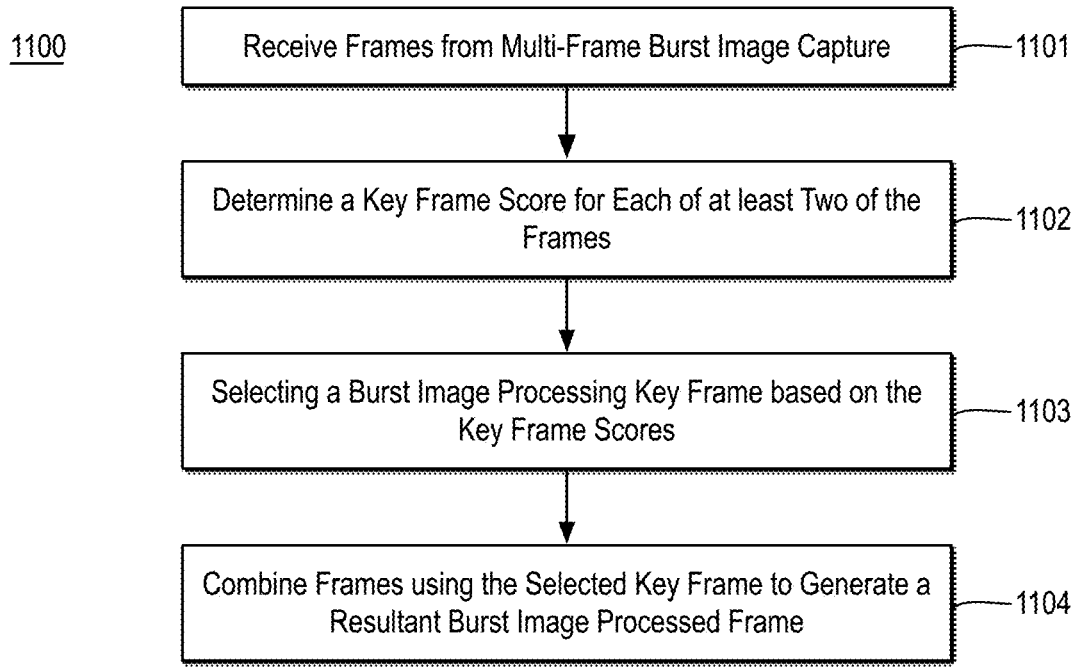
FIG. 11 is a flow diagram illustrating an example process for performing burst image processing.

FIG. 11 is a flow diagram illustrating an example process 1000 for performing burst image processing, arranged in accordance with at least some implementations of the present disclosure. Process 1100 may include one or more operations 1101-1104 as illustrated in FIG. 11. Process 1100 may form at least part of a burst imaging process including selection of a burst image processing key frame. By way of non-limiting example, process 1100 may form at least part of a burst imaging process as performed by any device, system, or combination thereof as discussed herein. Furthermore, process 1100 will be described herein with reference to system 1200 of FIG. 12, which may perform one or more operations of process 1100.

Figure 12:
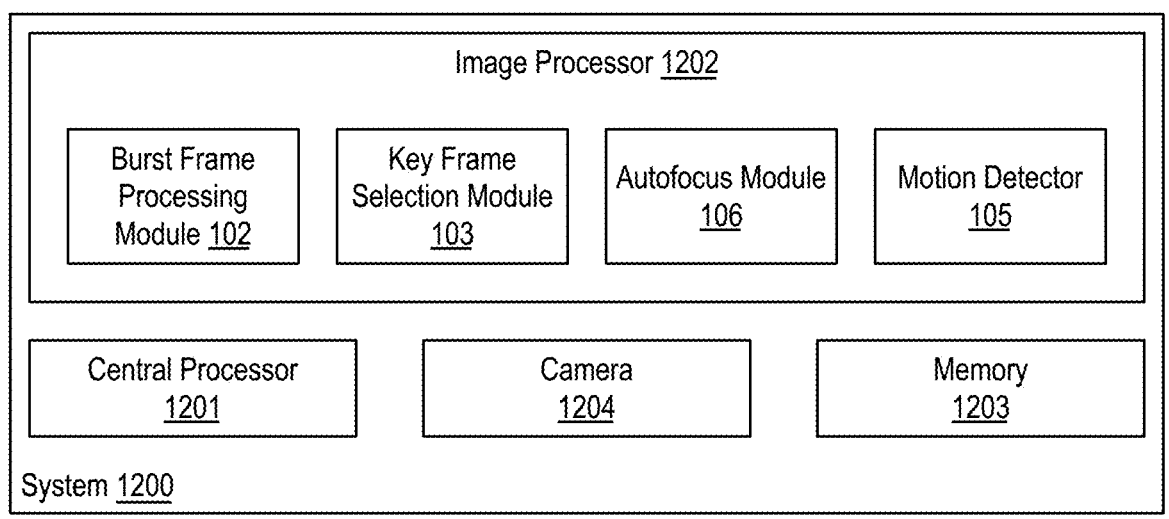
FIG. 12 is an illustrative diagram of an example system for performing burst image processing.

FIG. 12 is an illustrative diagram of an example system 1200 for performing burst image processing, arranged in accordance with at least some implementations of the present disclosure. As shown in FIG. 12, system 1200 may include a central processor 1201, an image processor 1202, a memory 1203, and a camera 1204. Also as shown, image processor 1202 may include or implement burst frame processing module 102, key frame selection module 103, autofocus module 104, and motion detector 105. Such components or modules may be implemented to perform operations as discussed herein. Memory 1203 may store frames, frame data, key frame selection component data, key frame selection weights, image quality data, key frame selection translation data, resultant frames, key frame indicators, motion indicators, or any other data discussed herein.

As shown, in some examples, burst frame processing module 102, key frame selection module 103, autofocus module 104, and motion detector 105 may be implemented via image processor 1202. In other examples, one or more or portions of burst frame processing module 102, key frame selection module 103, autofocus module 104, and motion detector 105 may be implemented via central processor 1201, a video processor, a graphics processor, or the like. In yet other examples, one or more or portions of burst frame processing module 102, key frame selection module 103, autofocus module 104, and motion detector 105 may be implemented via a frame, image, or video processing pipeline or unit.

Image processor 1202 may include any number and type of graphics, image, or video processing units that may provide the operations as discussed herein. In some examples, image processor 1202 may be an image signal processor. Such operations may be implemented via software or hardware or a combination thereof. For example, image processor 1202 may include circuitry dedicated to manipulate frame data, image data, or video data obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory.

In an embodiment, one or more or portions of burst frame processing module 102, key frame selection module 103, autofocus module 104, and motion detector 105 may be implemented via an execution unit (EU) of image processor 1202. The EU may include, for example, programmable logic or circuitry such as a logic core or cores that may provide a wide array of programmable logic functions. In an embodiment, one or more or portions of burst frame processing module 102, key frame selection module 103, autofocus module 104, and motion detector 105 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of burst frame processing module 102, key frame selection module 103, autofocus module 104, and motion detector 105 may be implemented via an application specific integrated circuit (ASIC). The ASIC may include an integrated circuitry customized to perform the operations discussed herein. Camera 1204 may include any camera having any suitable number of lenses, an image sensor for capturing images or video, and an optional preprocessor.

Returning to discussion of FIG. 11, process 1100 begins at operation 1101, where multiple frames are received corresponding to a multi-frame burst image capture. For example, any number of frames may be captured during a burst image capture (e.g., 8 or 9 frames) and a subset of the captured frames or all of the captured frames may be received for processing.

Processing continues at operation 1102, where a key frame score is determined for each of at least two frames of the plurality of frames such that each key frame score includes an image quality component, a shutter lag component, and a burst image processing latency component. As discussed, each component is a value indicative of an impact on user experience of the pertinent factor. For example, the image quality component increases with increased image quality or image sharpness of the key frame, the shutter lag component increases with decreased shutter lag, and the burst image processing latency component increases with decreased processing latency.

In an embodiment, each key frame score further includes a moving object component. For example, the moving object component may be at a maximum for a middle frame(s) of the burst frames and may decrease moving away from the middle frame(s) to the first frame and the last frame of the burst frame. In an embodiment, process 1100 further includes evaluating at least a second subset of the multiple frames to generate a moving object indicator and including, in response to the moving object indicator indicating one or moving objects or global motion, a moving object component in the key frame score for each of the at least two frames. For example, the moving object component may be determined using a moving object function of a frame number of the at least two frames in a temporal frame number count of the plurality of frames such that the moving object function provides a first component value for a first frame number, a second component value for a second frame number, and a third component value for a third frame number, such that the second frame number is temporally subsequent to the first frame number and the third frame number is temporally subsequent to the second frame number, and such that the second component value is greater than both the first and third component values.

The image quality component, shutter lag component, and burst image processing latency component may be determined using any suitable technique or techniques. In an embodiment, the image quality component for a frame is determined using a monotonically increasing function of an image quality value for the first frame. In an embodiment, the image quality value is an autofocus blur value for the frame. In an embodiment, process 1100 further includes generating an image quality value for a frame by applying a linear quadratic estimation to a sharpness value, a gyroscopic motion value, and an autofocus blur value for the frame. For example, the linear quadratic estimation may apply a Kalman filter to the sharpness value, gyroscopic motion value, and autofocus blur. In an embodiment, the image quality component for a frame is determined using a monotonically increasing function of an image quality value for the frame, the shutter lag component is determined using a monotonically decreasing function of a shutter lag value for the frame, and the burst image processing latency component is determined using a monotonically decreasing function of a burst image processing latency value for the frame, such that the shutter lag value is a time difference between a shutter actuation time and an image capture time of the first frame and the burst image processing latency value is a time difference between a sum of the selection time of the first frame and a constant burst image processing time and the shutter actuation time. In an embodiment, the image quality component for a frame is determined using a monotonically increasing function of a sharpness value for the frame. In an embodiment, the shutter lag component is determined using a monotonically decreasing function of a frame number of the frame in a temporal frame number count of the plurality of frames. In an embodiment, the processing latency component is determined using a monotonically decreasing function of a frame number of the frame in a temporal frame number count of the plurality of frames.

The key frame score for each frame may be determined using any suitable technique or techniques. In an embodiment, each key frame score comprises a sum of a product of a first weight and the image quality component, a product of a second weight and the shutter lag component, and a product of a third weight and the burst image processing latency component. In an embodiment, each key frame score comprises a sum of a product of an image quality component weight and the image quality component, a product of a shutter lag component weight and the shutter lag component, and a product of a burst image processing latency component weight and the burst image processing latency component. In an embodiment, each key frame score comprises a sum of the image quality component, the shutter lag component, and the burst image processing latency component. In an embodiment, each key frame score comprises a product of the image quality component, the shutter lag component, and the burst image processing latency component. In some embodiments, each of the described key frame scores may include a moving object component (i.e., also summing a product of fourth weight and the moving object component, also summing a product of a moving object component weight and the moving object component, also summing the moving object component, or also including the moving object component in the product, respectively).

Furthermore, process 1100 may include receiving selection of a particular mode from multiple burst optimization modes such that the plurality of burst optimization modes include at least a high image quality mode and a fast operation mode. For example, the burst optimization modes may be presented to a user for selection such that selection is received via a user interface device or the selection may be made by an application performing burst imaging. In response to the selection, the particular mode may be implemented by modifying the first, second, and third weights (and optionally a fourth weight such that the weights correspond, respectively, to the image quality component, the shutter lag component, the burst image processing latency component, and the moving object component). In an embodiment, in the high image quality mode, the first weight has a first value and the third weight has a second value and, in the fast operation mode, the first weight has a third value and the third weight has a fourth value, such that the first value is greater than the third value and the fourth value is greater than the second value.

Processing continues at operation 1103, where a burst image processing key frame is selected for the multiple frames based on the key frame scores. The key frame may be selected using any suitable technique or techniques. In an embodiment, the key frame is selected based on the frame having a maximum key frame score of the key frame scores. In an embodiment, each of at least two frames include a first frame and a second frame that is temporally subsequent to the first frame and process 1100 further includes determining a maximum or expected key frame score for a third frame of the plurality of frames such that the third frame is temporally subsequent to the second frame, comparing the maximum or expected key frame score for the third frame to a maximum of the key frame scores of the first and second frames, and generating, in response to the maximum or expected key frame score for the third frame exceeding the maximum of the key frame scores of the first and second frames, a key frame score for the third frame or bypassing, in response to the maximum or expected key frame score for the third frame not exceeding the maximum of the key frame scores of the first and second frames, generation of a key frame score for the third frame. Furthermore, process 1100 may further include, in response to the maximum or expected key frame score for the third frame not exceeding the maximum of the key frame scores of the first and second frames, selecting the frame corresponding to the maximum of the key frame scores of the first and second frames for use as the burst image processing key frame and bypassing key frame score generation for remaining frames of the plurality of frames, such that said combining is performed in parallel with an image capture of at least one of the remaining frames. In an embodiment, determining the maximum or expected key frame score for the third frame includes determining a maximum or expected image quality component for the third frame, a shutter lag component for the third frame, and a burst image processing latency component for the third frame, such that the maximum or expected image quality component for the third frame is based on one of a maximum available image quality value or a probabilistic image quality value for the third frame generated based at least in part on image quality values of the first and second frames.

In an embodiment, process 1100 further includes evaluating a second plurality of frames temporally prior to the plurality of frames corresponding to the multi-frame burst image capture to generate a moving object indicator (e.g., indicating there is motion) and including, in response to the moving object indicator, a moving object component in the key frame scores for each of the at least two frames.

In an embodiment, the at least two frames include a first frame and a second frame that is temporally subsequent to the first frame and process 1100 further includes determining a maximum or expected key frame score for a third frame of the plurality of frames such that the third frame is temporally subsequent to the second frame, the maximum or expected key frame score for the third frame includes a maximum or expected image quality component for the third frame, a shutter lag component for the third frame, a burst image processing latency component for the third frame, and a moving object component for the third frame, comparing the maximum or expected key frame score to a maximum of the key frame scores of the first and second frames, and generating, in response to the maximum or expected key frame score exceeding the maximum of the key frame scores of the first and second frames, a key frame score for the third frame or bypassing, in response to the maximum or expected key frame score not exceeding the maximum of the key frame scores of the first and second frames, generation of a key frame score for the third frame.

Processing continues at operation 1104, where at least portions of at least a subset of the multiple frames are combined using the selected key frame to generate a resultant burst image processed frame. The portions or entireties of the subset or all of the multiple frames may be combined using any suitable technique or techniques such that the selected key frame is used as a key frame in the processing. In an embodiment, the selected key frame is not modified in the processing while other frames are registered or shifted to the selected key frame to generate the resultant burst image processed frame.

Process 1100 may be repeated any number of times either in series or in parallel for any number burst image captures or the like. For example, process 1100 may provide for key frame selection in burst frame image processing for any number of image capture instances.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
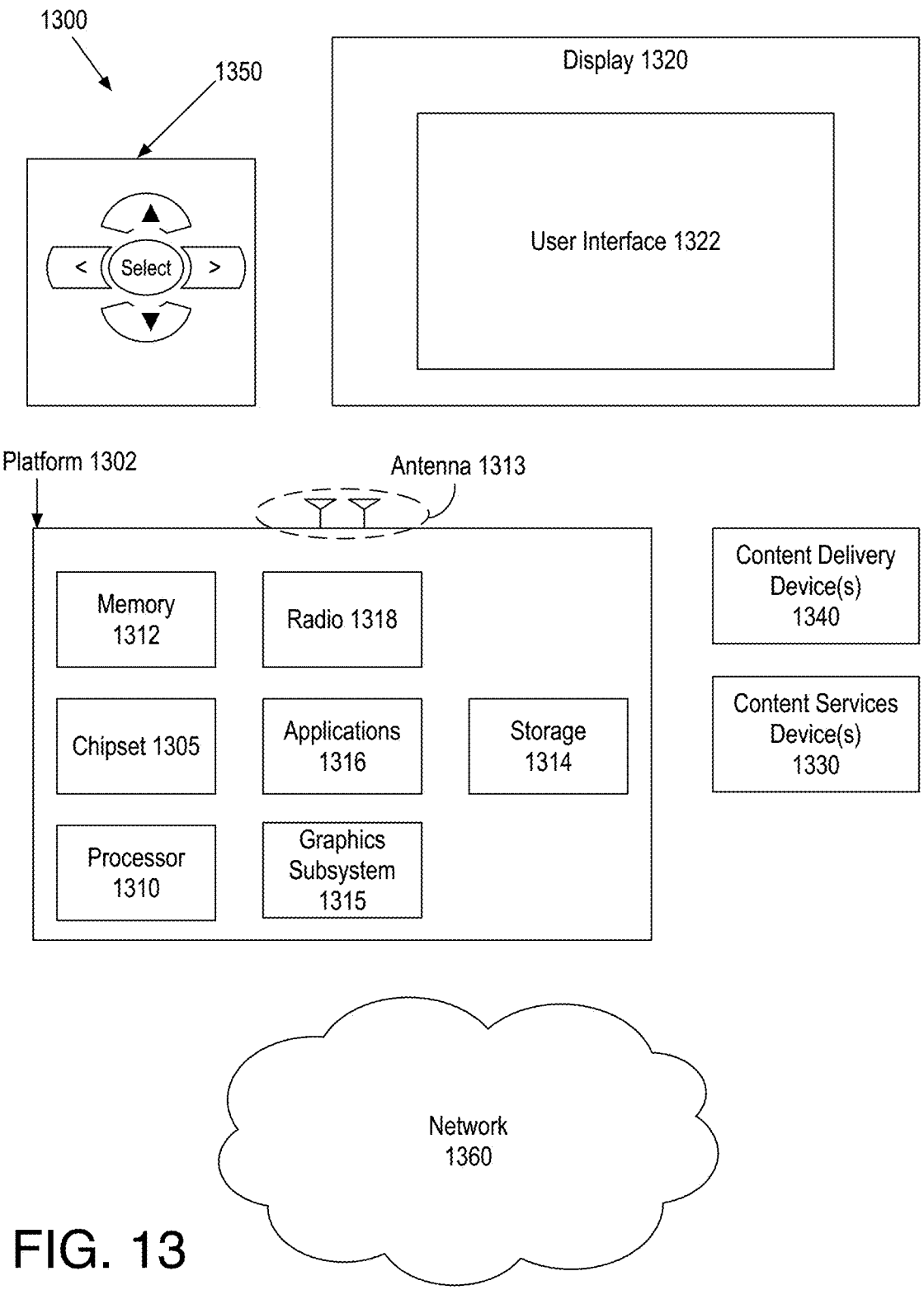
FIG. 13 is an illustrative diagram of an example system.

FIG. 13 is an illustrative diagram of an example system 1300, arranged in accordance with at least some implementations of the present disclosure. In various implementations, system 1300 may be a mobile system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of may be used to interact with user interface 1322, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1320) by movements of a pointer, cursor, focus ring, or other visual indicators displayed on the display. For example, under the control of software applications 1316, the navigation features located on navigation may be mapped to virtual navigation features displayed on user interface 1322, for example. In various embodiments, may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
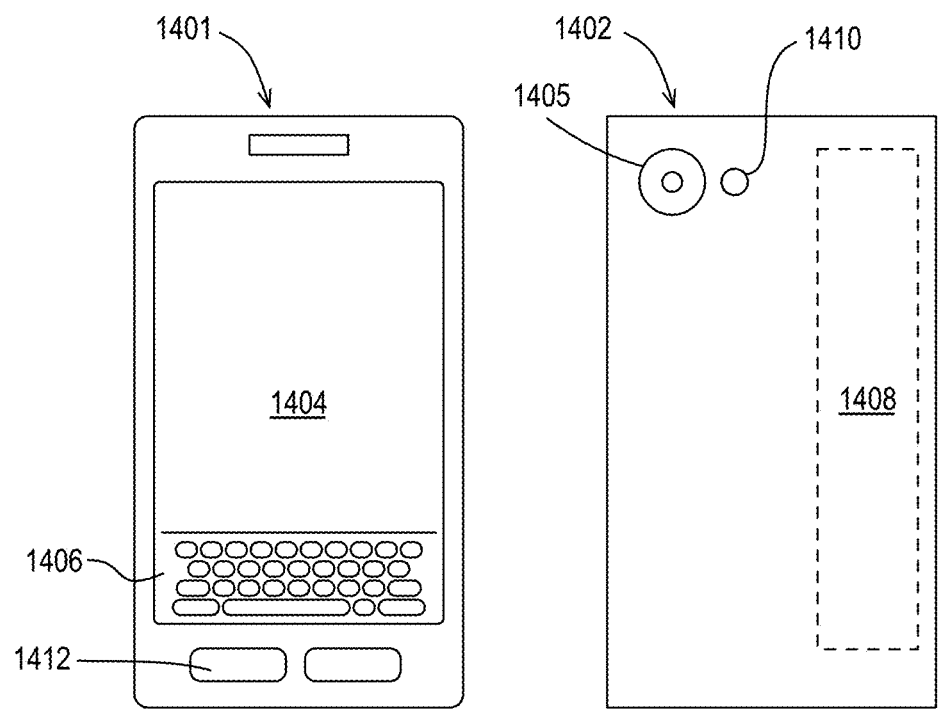
FIG. 14 illustrates an example small form factor device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, system 100 or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing burst image processing comprising:
    receiving a plurality of frames corresponding to a multi-frame burst image capture;
    determining a key frame score for each of at least two frames of the plurality of frames, wherein each key frame score comprises an image quality component, a shutter lag component, and a burst image processing latency component;
    selecting a burst image processing key frame for the plurality of frames based on the key frame scores; and
    combining at least portions of at least a subset of the plurality of frames using the selected key frame to generate a resultant burst image processed frame.

2. The method of claim 1, wherein the at least two frames comprise a first frame and a second frame that is temporally subsequent to the first frame, the method further comprising:
    determining a maximum or expected key frame score for a third frame of the plurality of frames, wherein the third frame is temporally subsequent to the second frame;
    comparing the maximum or expected key frame score for the third frame to a maximum of the key frame scores of the first and second frames; and
    generating, in response to the maximum or expected key frame score for the third frame exceeding the maximum of the key frame scores of the first and second frames, a key frame score for the third frame or bypassing, in response to the maximum or expected key frame score for the third frame not exceeding the maximum of the key frame scores of the first and second frames, generation of a key frame score for the third frame.

3. The method of claim 2, wherein, in response to the maximum or expected key frame score for the third frame not exceeding the maximum of the key frame scores of the first and second frames, the method further comprises:
    selecting the frame corresponding to the maximum of the key frame scores of the first and second frames for use as the burst image processing key frame; and
    bypassing key frame score generation for remaining frames of the plurality of frames, wherein said combining is performed in parallel with an image capture of at least one of the remaining frames.

4. The method of claim 2, wherein determining the maximum or expected key frame score for the third frame comprises determining a maximum or expected image quality component for the third frame, a shutter lag component for the third frame, and a burst image processing latency component for the third frame, wherein the maximum or expected image quality component for the third frame is based on one of a maximum available image quality value or a probabilistic image quality value for the third frame generated based at least in part on image quality values of the first and second frames.

5. The method of claim 1, further comprising:
    evaluating a second plurality of frames temporally prior to the plurality of frames corresponding to the multi-frame burst image capture to generate a moving object indicator; and
    including, in response to the moving object indicator, a moving object component in the key frame scores for each of the at least two frames.

6. The method of claim 1, wherein the at least two frames comprise a first frame and a second frame that is temporally subsequent to the first frame, the method further comprising:
    determining a maximum or expected key frame score for a third frame of the plurality of frames, wherein the third frame is temporally subsequent to the second frame, the maximum or expected key frame score for the third frame comprising a maximum or expected image quality component for the third frame, a shutter lag component for the third frame, a burst image processing latency component for the third frame, and a moving object component for the third frame;
    comparing the maximum or expected key frame score to a maximum of the key frame scores of the first and second frames; and
    generating, in response to the maximum or expected key frame score exceeding the maximum of the key frame scores of the first and second frames, a key frame score for the third frame or bypassing, in response to the maximum or expected key frame score not exceeding the maximum of the key frame scores of the first and second frames, generation of a key frame score for the third frame.

7. The method of claim 1, further comprising:
    evaluating at least a second subset of the plurality of frames to generate a moving object indicator; and
    including, in response to the moving object indicator, a moving object component in the key frame score for each of the at least two frames, wherein the moving object component is determined using a moving object function of a frame number of the at least two frames in a temporal frame number count of the plurality of frames, wherein the moving object function provides a first component value for a first frame number, a second component value for a second frame number, and a third component value for a third frame number, wherein the second frame number is temporally subsequent to the first frame number and the third frame number is temporally subsequent to the second frame number, and wherein the second component value is greater than both the first and third component values.

8. The method of claim 1, wherein the image quality component for a first frame of the at least two frames is determined using a monotonically increasing function of an image quality value for the first frame.

9. The method of claim 8, wherein the image quality value for the first frame comprises an autofocus blur value.

10. The method of claim 8, further comprising:
    generating the image quality value for the first frame by applying a linear quadratic estimation to a sharpness value, a gyroscopic motion value, and an autofocus blur value for the first frame.

11. The method of claim 1, wherein the image quality component for a first frame of the at least two frames is determined using a monotonically increasing function of an image quality value for the first frame, the shutter lag component is determined using a monotonically decreasing function of a shutter lag value for the first frame, and the burst image processing latency component is determined using a monotonically decreasing function of a burst image processing latency value for the first frame, wherein the shutter lag value is a time difference between a shutter actuation time and an image capture time of the first frame and the burst image processing latency value is a time difference between a sum of the selection time of the first frame and a constant burst image processing time and the shutter actuation time.

12. The method of claim 1, wherein each key frame score comprises a sum of a product of a first weight and the image quality component, a product of a second weight and the shutter lag component, and a product of a third weight and the burst image processing latency component.

13. The method of claim 12, further comprising:
receiving selection of a particular mode from a plurality of burst optimization modes, wherein the plurality of burst optimization modes comprise at least a high image quality mode and a fast operation mode; and
implementing the particular mode by modifying the first, second, and third weights, wherein, in the high image quality mode, the first weight has a first value and the third weight has a second value and, in the fast operation mode, the first weight has a third value and the third weight has a fourth value, wherein the first value is greater than the third value and the fourth value is greater than the second value.

14. A device comprising:
a memory to store a plurality of frames corresponding to a multi-frame burst image capture; and
one or more processors coupled to the memory, the one or more processors to:
determine a key frame score for each of at least two frames of the plurality of frames, wherein each key frame score comprises an image quality component, a shutter lag component, and a burst image processing latency component;
select a burst image processing key frame for the plurality of frames based on the key frame scores; and
combine at least portions of at least a subset of the plurality of frames using the selected key frame to generate a resultant burst image processed frame.

15. The device of claim 14, wherein the at least two frames comprise a first frame and a second frame that is temporally subsequent to the first frame, the one or more processors to:
determine a maximum or expected key frame score for a third frame of the plurality of frames, wherein the third frame is temporally subsequent to the second frame;
compare the maximum or expected key frame score for the third frame to a maximum of the key frame scores of the first and second frames; and
generate, in response to the maximum or expected key frame score for the third frame exceeding the maximum of the key frame scores of the first and second frames, a key frame score for the third frame or bypass, in response to the maximum or expected key frame score for the third frame not exceeding the maximum of the key frame scores of the first and second frames, generation of a key frame score for the third frame.

16. The device of claim 15, wherein, in response to the maximum or expected key frame score for the third frame not exceeding the maximum of the key frame scores of the first and second frames, the one or more processors are to:
select the frame corresponding to the maximum of the key frame scores of the first and second frames for use as the burst image processing key frame; and
bypass key frame score generation for remaining frames of the plurality of frames, wherein the processor to combine is to be performed in parallel with an image capture of at least one of the remaining frames.

17. The device of claim 14, the one or more processors to:
evaluate a second plurality of frames temporally prior to the plurality of frames corresponding to the multi-frame burst image capture to generate a moving object indicator; and
include, in response to the moving object indicator, a moving object component in the key frame scores for each of the at least two frames.

18. The device of claim 14, wherein the at least two frames comprise a first frame and a second frame that is temporally subsequent to the first frame, the one or more processors to:
determine a maximum or expected key frame score for a third frame of the plurality of frames, wherein the third frame is temporally subsequent to the second frame, the maximum or expected key frame score for the third frame comprising a maximum or expected image quality component for the third frame, a shutter lag component for the third frame, a burst image processing latency component for the third frame, and a moving object component for the third frame;
compare the maximum or expected key frame score to a maximum of the key frame scores of the first and second frames; and
generate, in response to the maximum or expected key frame score exceeding the maximum of the key frame scores of the first and second frames, a key frame score for the third frame or bypassing, in response to the maximum or expected key frame score not exceeding the maximum of the key frame scores of the first and second frames, generation of a key frame score for the third frame.

19. The device of claim 14, wherein the image quality component for a first frame of the at least two frames is determined using a monotonically increasing function of an image quality value for the first frame and wherein the image quality value for the first frame comprises an autofocus blur value.

20. At least one non-transitory machine readable medium comprising a plurality of instructions that, in response to being executed on a device, cause the device to perform burst image processing by:
receiving a plurality of frames corresponding to a multi-frame burst image capture;
determining a key frame score for each of at least two frames of the plurality of frames, wherein each key frame score comprises an image quality component, a shutter lag component, and a burst image processing latency component;
selecting a burst image processing key frame for the plurality of frames based on the key frame scores; and
combining at least portions of at least a subset of the plurality of frames using the selected key frame to generate a resultant burst image processed frame.

21. The non-transitory machine readable medium of claim 20, wherein the at least two frames comprise a first frame and a second frame that is temporally subsequent to the first frame, the machine readable medium comprising further instructions that, in response to being executed on the device, cause the device to perform burst image processing by:
determining a maximum or expected key frame score for a third frame of the plurality of frames, wherein the third frame is temporally subsequent to the second frame;
comparing the maximum or expected key frame score for the third frame to a maximum of the key frame scores of the first and second frames; and
generating, in response to the maximum or expected key frame score for the third frame exceeding the maximum of the key frame scores of the first and second frames, a key frame score for the third frame or bypassing, in response to the maximum or expected key frame score for the third frame not exceeding the maximum of the key frame scores of the first and second frames, generation of a key frame score for the third frame.

22. The non-transitory machine readable medium of claim 20, the machine readable medium comprising further instructions that, in response to being executed on the device, cause the device to perform burst image processing by, in response to the maximum or expected key frame score for the third frame not exceeding the maximum of the key frame scores of the first and second frames:
  selecting the frame corresponding to the maximum of the key frame scores of the first and second frames for use as the burst image processing key frame; and
  bypassing key frame score generation for remaining frames of the plurality of frames, wherein said combining is performed in parallel with an image capture of at least one of the remaining frames.

23. The non-transitory machine readable medium of claim 20, the machine readable medium comprising further instructions that, in response to being executed on the device, cause the device to perform burst image processing by:
  evaluating a second plurality of frames temporally prior to the plurality of frames corresponding to the multi-frame burst image capture to generate a moving object indicator; and
  including, in response to the moving object indicator, a moving object component in the key frame scores for each of the at least two frames.

24. The non-transitory machine readable medium of claim 20, wherein the at least two frames comprise a first frame and a second frame that is temporally subsequent to the first frame, the machine readable medium comprising further instructions that, in response to being executed on the device, cause the device to perform burst image processing by:
  determining a maximum or expected key frame score for a third frame of the plurality of frames, wherein the third frame is temporally subsequent to the second frame, the maximum or expected key frame score for the third frame comprising a maximum or expected image quality component for the third frame, a shutter lag component for the third frame, a burst image processing latency component for the third frame, and a moving object component for the third frame;
  comparing the maximum or expected key frame score to a maximum of the key frame scores of the first and second frames; and
  generating, in response to the maximum or expected key frame score exceeding the maximum of the key frame scores of the first and second frames, a key frame score for the third frame or bypassing, in response to the maximum or expected key frame score not exceeding the maximum of the key frame scores of the first and second frames, generation of a key frame score for the third frame.

25. The non-transitory machine readable medium of claim 20, wherein the image quality component for a first frame of the at least two frames is determined using a monotonically increasing function of an image quality value for the first frame and wherein the image quality value for the first frame comprises an autofocus blur value.

* * * * *